United States Patent [19]
Clemons

[11] Patent Number: 6,108,168
[45] Date of Patent: *Aug. 22, 2000

[54] TENSION STABILIZER INSERT FOR DATA CARTRIDGE

[75] Inventor: Gregory Ray Clemons, Dothan, Ala.

[73] Assignees: Sony Corporation, Tokyo, Japan; Sony Electronics, Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/969,419

[22] Filed: Oct. 21, 1997

[51] Int. Cl.[7] .............................. G11B 23/04; G11B 15/60
[52] U.S. Cl. ............... 360/132; 360/130.32; 360/130.33; 242/343.1
[58] Field of Search ............................. 360/132, 130.33, 360/130.32, 130.31, 130.3; 242/346, 347, 334, 343.1

[56] References Cited

U.S. PATENT DOCUMENTS

| | | | |
|---|---|---|---|
| 3,642,220 | 2/1972 | Merry | 360/130.33 |
| 3,856,235 | 12/1974 | Wallace | 242/346.1 |
| 3,888,429 | 6/1975 | Mack | 242/346 |
| 3,934,842 | 1/1976 | Posso | 242/346 |
| 4,204,654 | 5/1980 | Gebeke | 242/346 |
| 4,290,567 | 9/1981 | Saito | 242/343.1 |
| 4,342,436 | 8/1982 | Oyama et al. | 360/130.33 |
| 4,343,024 | 8/1982 | Kawai | 360/132 |
| 4,569,492 | 2/1986 | Gelardi et al. | 242/343.1 |
| 4,780,782 | 10/1988 | Bordignon | 360/130.31 |
| 4,942,492 | 7/1990 | Che | 360/130.33 |
| 5,138,510 | 8/1992 | Ryu | 242/343.1 |
| 5,345,355 | 9/1994 | Teuber et al. | 360/132 |
| 5,438,466 | 8/1995 | Koguchi et al. | 360/96.4 |
| 5,605,300 | 2/1997 | Uetake et al. | 242/336 |

Primary Examiner—Craig A. Renner
Attorney, Agent, or Firm—Ronald P. Kananen; Rader, Fishman & Grauer

[57] ABSTRACT

A stabilizer insert is attached to a magnetic tape cartridge, where the cartridge includes a magnetic tape, a bay portion where the magnetic tape is exposed to the outside of the tape cartridge so that a read/write device can physically contact the tape. The stabilizer insert provides tension on the tape sufficient to maintain contact between the tape and the read/write device.

9 Claims, 2 Drawing Sheets

TENSION STABILIZER INSERT FOR DATA CARTRIDGE

FIELD OF THE INVENTION

This invention relates to magnetic tape cartridges, including but not limited to known quarter inch cartridge (QIC) Wide, and TRAVAN® data cartridges. More particularly, this invention relates to a tension stabilizer insert which maintains contact between an external read/write device and the magnetic tape in the tape cartridge.

BACKGROUND OF THE INVENTION

Magnetic tape cartridges are widely used for data storage. A conventional magnetic tape cartridge comprises a base plate and a cover. Reel mounts are located on the base plate, on which tape reels are held in place. A magnetic tape is attached to two tape reels, and is wound around one or both of the reels. The reels are rotatable on the reel mounts, allowing the reels to transfer the commonly attached magnetic tape from one reel, acting as a supply reel, to the other reel, which acts as a takeup reel upon rotation. The tape travels a fixed path, from the tape supply reel to the takeup reel, about a pair of spaced corner pins.

A portion of the tape is exposed to the outside of the cartridge by means of an open bay portion which may comprise a door or other protective lid-type feature for protection of the tape when the cartridge is not in use. Between the bay portion and a side of the cassette, the tape extends over split post members which guide the tape to the bay portion.

When the cartridge is in use, the bay portion of the cartridge receives an external read/write device which sends data to be recorded onto a tape, or retrieves recorded information from the tape. The read/write device accomplishes this by entering the bay portion, and contacting the tape.

As the tape extends across the bay portion of the cartridge, moving from one reel to the other, the tension in the tape is the greatest when each reel is holding equal amounts of tape. However, when any one reel is holding more or less tape than the other reel, the tension in the tape can become insufficient for enabling continuous physical contact between the tape and the read/write device. This lack of tension in the tape, and in turn, lack of physical contact between the tape and the read/write device, causes the transfer of information between the two elements to fail. As a result, some or all of the information intended to be transferred will be missing upon playback or subsequent transferring of information.

Accordingly, there is a need to provide a magnetic tape cartridge in which a desired range of tension in the magnetic tape may be maintained. The range of tension must be such that is sufficient to enable complete and direct contact between a read/write device and the magnetic tape, thus ensuring accurate and complete transfer of information between the two elements.

There is also a need in the art for means for maintaining a desired range of tension in tape included in existing magnetic tape cartridges which otherwise fail to transmit information between the tape and the read/write device. The range of tension should be sufficient to enable complete and direct contact between the read/write device and the magnetic tape, thus ensuring accurate and complete transfer of information between the two elements.

SUMMARY OF THE INVENTION

It is an object of the invention to meet the aforementioned needs. In fulfillment of this object, a magnetic tape data cartridge having a tension stabilizer insert is provided according to the present invention. The stabilizer insert bends upward, into the bay portion of the cartridge, beneath the exposed portion of the tape. The split post members frictionally hold the stabilizer insert in place outside of the bay portion. Adhesive may be used to hold the stabilizer insert between the split post members. The stabilizer insert maintains a desired range of tension in the tape when the tape and the insert are in contact. This in turn maintains a sufficient amount of pressure between the read/write member and the tape.

It is a further object of the invention to provide a resilient, flexible, relatively rigid stabilizer insert which will provide the desired tension in the magnetic tape over a wide range of temperatures which the cartridge may be subjected to during the normal course of operation. This object is accomplished by providing a lifter device which comprises a relatively rigid plastic sheeting, such as DELRIN®.

It is another object of the present invention to provide a stabilizer insert which can be easily introduced into existing magnetic tape cartridges, to provide a desired range of tension in the magnetic tape. This object is accomplished by providing an insert which comprises a relatively rigid plastic sheeting, such as DELRIN®, which may be attached to the existing magnetic tape cartridge between the split post members. The insert bends upward into the bay portion of the cartridge beneath the exposed portion of the tape. The insert maintains a desired range of tension in the tape when the tape and the insert are in contact. This in turn maintains a sufficient amount of pressure between the read/write member and the tape to maintain contact between them.

Another object of the invention is to provide a method for maintaining contact between a magnetic tape in a tape cartridge and an external read/write device, including the steps of providing a tape cartridge wherein a portion of the tape is exposed outside the tape cartridge at a bay portion of the tape, and attaching a stabilizer insert which extends into the bay portion of the cartridge, wherein the insert causes a sufficient range of tension in the tape to maintain said contact. As described above, the insert may be made from a heat resistant plastic material such as DELRIN®.

DETAILED DESCRIPTION OF THE INVENTION

The problem of low tape tension when tape reels in a magnetic tape cartridge have unequal amounts of tape are overcome by the use of the stabilizer insert as described above. Various materials were used to manufacture the insert. Relatively rigid plastics such as DELRIN® were found to have excellent desired properties such as heat resistance, and relative rigidity.

The inserts were tested using magnetic tape cartridges that had previously failed to provide sufficient tension in the magnetic tape to maintain contact between the tape and a read/write device during normal use. In every instance, tape tension in magnetic tape cartridges that would otherwise be insufficient, improved to a degree wherein contact between the tape and a read/write device was continuous throughout the transfer from one tape reel to the next.

The present invention will be understood more fully from the detailed description given herebelow and from the accompanying drawings of embodiments of the invention. However, the drawings are not intended to imply limitation of the invention to a specific embodiment, but are for explanation and understanding only.

Figure 1:
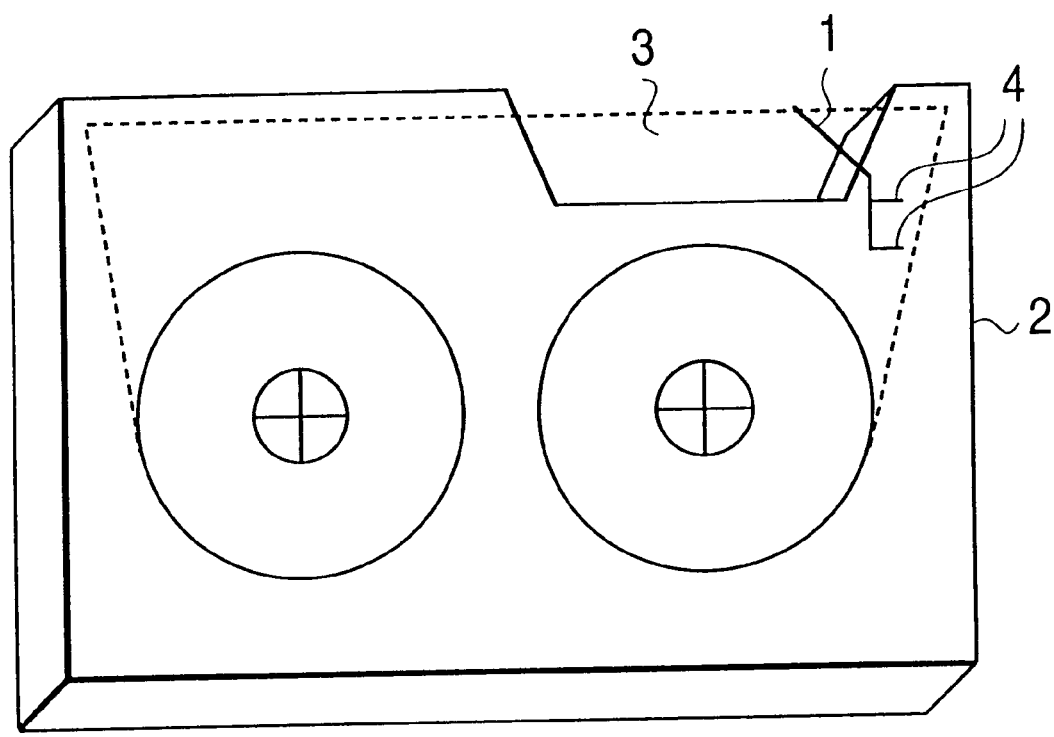
FIG. 1 is a front view of a magnetic tape cartridge with a bent stabilizer insert according to the present invention.

In FIG. 1, an insert 1 is attached to a cartridge 2 from outside of the bay portion 3 of the cartridge. The insert 1 may be welded in place, attached with an adhesive, or frictionally held in place. The insert 1 has notches 4 which may be used to hold the insert in place as the notches are placed against or around other members of the cartridge. The insert has a member that extends into the bay portion of the cartridge. The extending member of the insert is small enough to remain beneath the tape, relative to the exterior of the tape cartridge.

Figure 2:
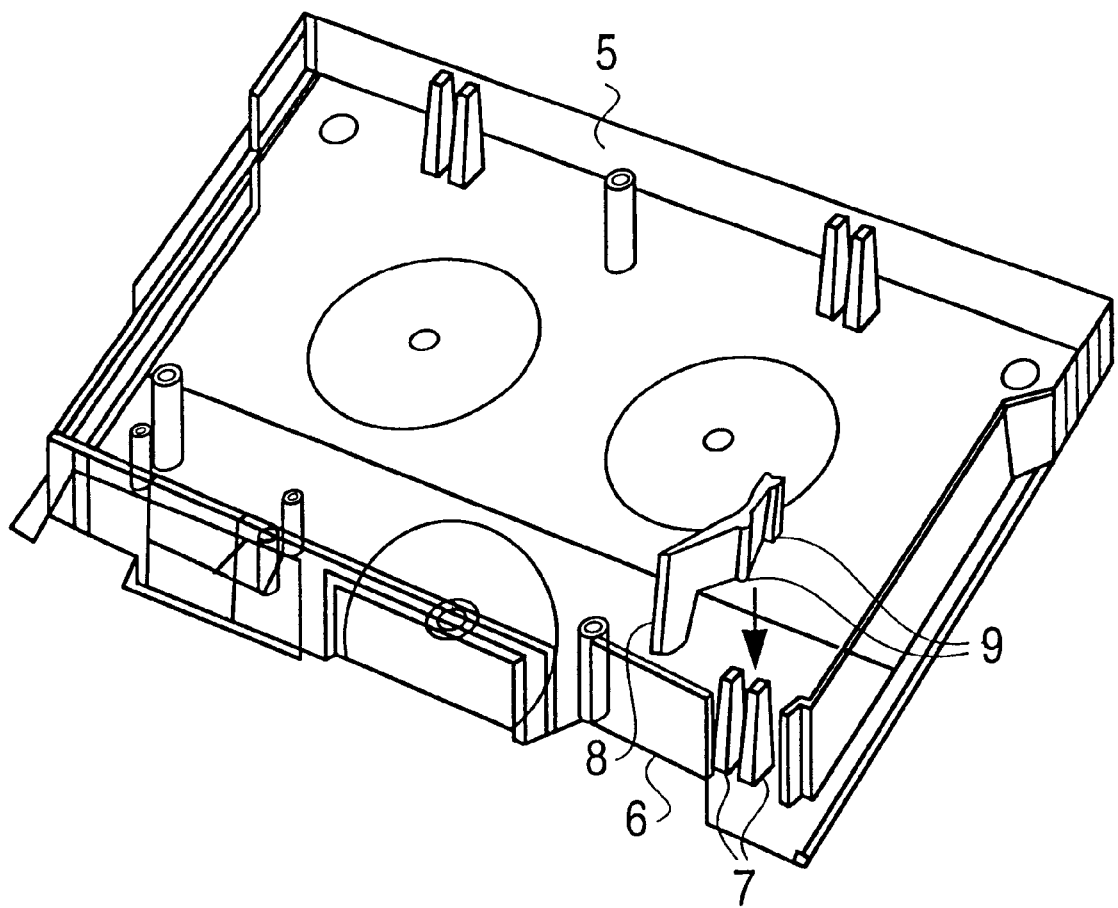
FIG. 2 is an interior view of a QIC magnetic tape cartridge cover with a bent stabilizer insert according to the present invention.

In FIG. 2, the cover of the tape cartridge 5 has a bay portion 6 from which, when assembled with a magnetic tape cartridge, the tape will be exposed to the exterior of the cartridge. Split post members 7 are located next to the bay portion 6 of the cover. The base member of the stabilizer insert 8 may be attached to the cover 5 between the split post members 7. The insert 8 may have notches 9 which may aid in positioning and securing the insert by surrounding at least one of the split post members 8.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A stabilizer insert, comprising:
    a distal end having a tape contact surface;
    a proximal end;
    a body section, between said distal end and said proximal end, that includes an elbow portion forming a distinct angle of less than 180 degrees in a first side surface of said stabilizer insert; and
    an attachment means located adjacent said proximal end, including a pair of projections extending substantially orthogonal from a second side surface of said stabilizer insert adjacent said proximal end and opposite said first surface for attaching said stabilizer insert to a magnetic tape cartridge between a pair of split post members of said magnetic tape cartridge.

2. A stabilizer insert as set forth in claim 1, wherein said stabilizer insert is made from a heat resistant material.

3. A stabilizer insert as set forth in claim 2, wherein said material is DELRIN®.

4. A magnetic tape cartridge comprising:
    a magnetic tape;
    a bay portion, wherein said magnetic tape is exposed to the outside of said tape cartridge, and wherein a read/write device can physically contact a first side of said tape; and
    a stabilizer insert having a distal end, a proximal end, and a body section between said distal end and said proximal end that includes an elbow portion that bends an entire length of said stabilizer insert at a distinct angle, wherein a surface that contacts a second side of said tape is located at said distal end, and an attachment means is located adjacent said proximal end, said attachment means including a pair of projections extending substantially orthogonal from a surface of said stabilizer insert adjacent said proximal end, and said attachment means being attached to said cartridge at an area outside of said bay portion with said distal end extending from said elbow portion into said bay portion, for providing tension on said tape sufficient to maintain contact between said tape and said read/write device.

5. A magnetic tape cartridge as set forth in claim 1, wherein said stabilizer insert is made from a heat resistant material.

6. A magnetic tape cartridge as set forth in claim 5, wherein said heat resistant material is DELRIN®.

7. A magnetic tape cartridge as set forth in claim 1, wherein said cartridge further comprises split post members located next to said bay portion, and wherein said stabilizer insert attachment means is attached to said cartridge between said split post members.

8. A method for maintaining contact between a magnetic tape in a tape cartridge and an external read/write device, comprising the steps of:
    providing a bay portion in said tape cartridge wherein said tape is exposed outside said tape cartridge;
    providing a stabilizer insert having a distal end, a proximal end, and a body section between said distal end and said proximal end that includes an elbow portion that bends a length of said stabilizer insert at a distinct angle, wherein a tape contact surface is located at said distal end, and an attachment means is located adjacent said proximal end, said attachment means including a pair of projections extending substantially orthogonal from a surface of said stabilizer insert adjacent said proximal end; and
    attaching said stabilizer insert attachment means to said cartridge outside of said bay portion in a manner wherein said stabilizer insert distal end extends from said elbow portion into said bay portion and provides sufficient tension in said tape to maintain said contact between said magnetic tape and said read/write device.

9. A method as set forth in claim 8, wherein said cartridge further comprises split post members located next to said bay portion, and wherein said stabilizer insert is attached to said cartridge between said split post members.

* * * * *